United States Patent [19]
Pilz et al.

[11] 3,986,345
[45] Oct. 19, 1976

[54] HEAT RECOVERING DEVICE FOR DISHWASHERS

[75] Inventors: Erwin Pilz, Rastatt; Berthold Schmidt, Karlsruhe, both of Germany

[73] Assignee: Stierlen-Maquet AG, Rastatt, Germany

[22] Filed: Apr. 4, 1975

[21] Appl. No.: 565,248

[30] Foreign Application Priority Data

| Dec. 3, 1974 | Germany | 7440114 |
| Dec. 4, 1974 | Germany | 2457182 |

[52] U.S. Cl. ............................ 62/238; 62/331
[51] Int. Cl.² .................................. F25B 29/00
[58] Field of Search ............ 62/238, 331; 134/105, 134/115 R

[56] References Cited
UNITED STATES PATENTS

| 2,829,869 | 4/1958 | Philipp | 62/238 X |
| 2,971,519 | 2/1961 | Willson | 134/105 X |
| 3,103,227 | 9/1963 | Long | 134/105 X |
| 3,922,877 | 12/1975 | Ophir et al. | 62/238 |

*Primary Examiner*—William E. Wayner
*Assistant Examiner*—William E. Tapolcai, Jr.
*Attorney, Agent, or Firm*—Walter Becker

[57] ABSTRACT

A device for recovering heat from dishwashing machines, especially dishwashing machines of the type in which dishes to be washed enter the dishwashing machine through an opening in one side and are removed from the dishwashing machine from an opening in the opposite side of the machine. The device has air inlet means positioned to receive heated air from the openings in the dishwashing machine and conveys the air via duct work through a heat exchanger. The heat pump compresses coolant fluid which then flows through condenser means and then to the evaporator wherein the heat exchange with the air occurs and then back to the pump. Water undergoes heat exchange with the coolant fluid in the condenser means and this water may be used during the dishwasher cycle. Control means control the supply of coolant fluid to the evaporator and the starting and stopping of the drive motor for the pump.

12 Claims, 7 Drawing Figures

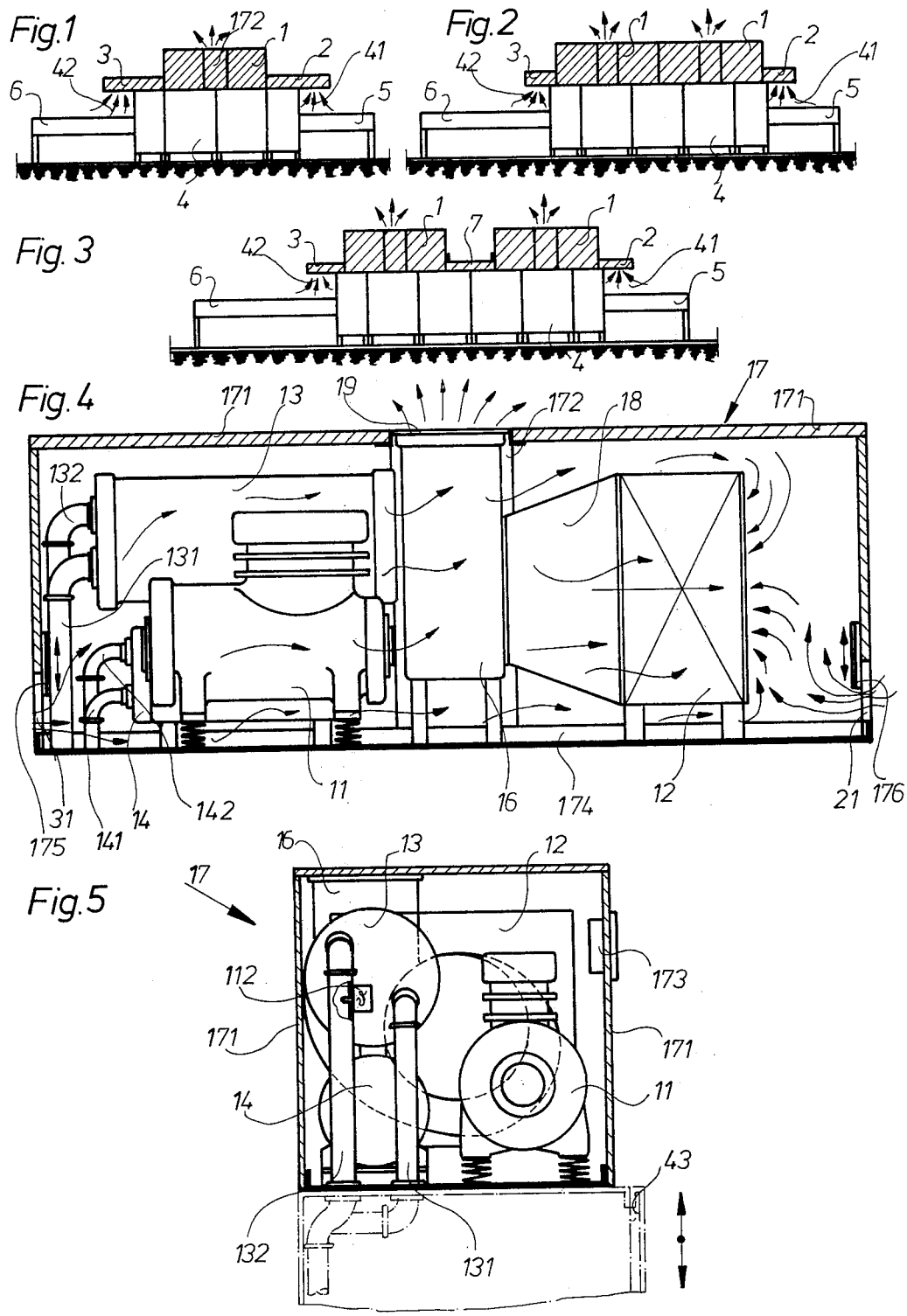

HEAT RECOVERING DEVICE FOR DISHWASHERS

The present invention relates to commercial dishwashers, and more specifically to a device of recovering by means of a heat pump, the heat being conveyed to the rinse chamber in such dishwashers.

It is an object of the present invention to adapt the heretofore known heat pump used in connection with dishwashers to the specific conditions of a commercial dishwasher.

It is another object of the invention so to design a dishwasher according to the preceding paragraph that the heat pump can be employed even when the space conditions are rather limited.

It is a further object of this invention to equip a dishwasher of the above mentioned type with automatic control devices for the heat requirement which varies considerably in conformity with the respective condition of operation of the dishwasher such as heating up, full load, half load, etc.

These and other objects and advantages of the invention will appear more clearly from the following specification, in connection with the accompanying drawings, in which:

FIG. 1 diagrammatically illustrates in view, a dishwasher according to the invention with a heat recovering device built thereupon, said recovering device being illustrated with shade lines together with the air passage pertaining thereto.

FIG. 2 shows an embodiment of the invention with two heat pumps arranged directly adjacent to each other and located on the dishwashing machine.

FIG. 3 likewise illustrates an embodiment with two heat pumps which, however, are interconnected by a short connecting air passage.

FIG. 4 diagrammatically illustrates a longitudinal section through the heat pump unit.

FIG. 5 is a cross section through the heat pump unit of FIG. 4.

Figure 6:
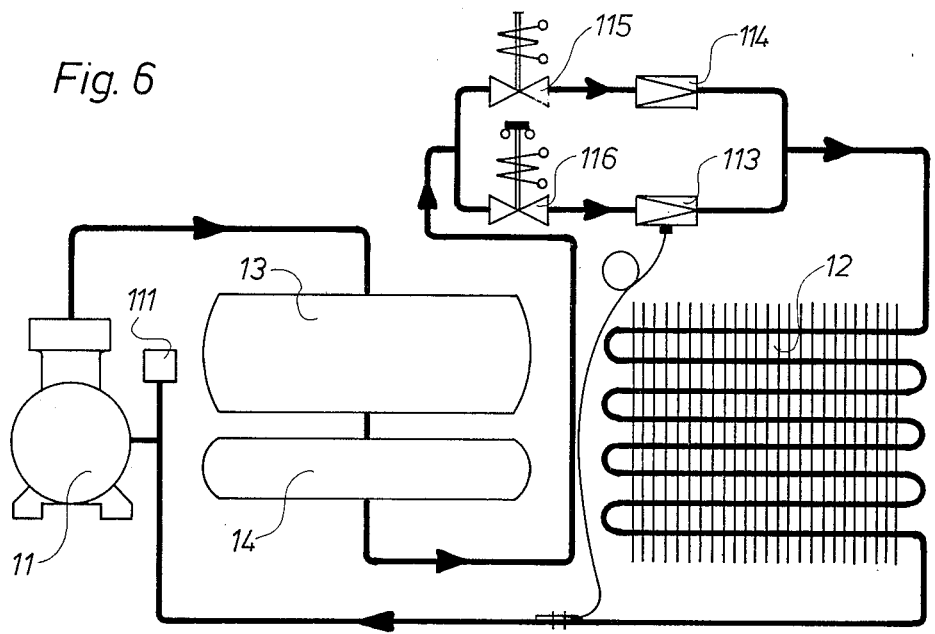
FIG. 6 shows a diagrammatic illustration of the heat pump circuit.

The heat recovering device according to the present invention which withdraws from the surrounding air the heat emanated by the dishwasher and condenses the steam leaving the dishwasher while recovering the evaporation heat and which conveys the recovered heat to the tank water or post-rinsing water of the machine is characterized primarily in that the heat pump which in a compact construction is located on a housing, is arranged on the dishwasher.

The problem of adapting the output has been solved by an alternately effective double through-flow control in the circuit of the heat pump and by a specific electric control corresponding to said double through-flow control.

The problem of adaptation to space-wise unfavorable conditions was found in the arrangement of the pump unit on the cover hood of the dishwashing machine. To this end a number of detailed problems were to be solved for the proper function and the obtainment of a satisfactory oscillation behavior, partially by extensive and expensive tests within the scope of the present invention.

The arrangement of the heat pump unit on the cover or hood of the dishwashing machine, will with the consequent employment of the advantages of this construction bring about favorable conditions for the provision of the air passage which then directly lie upon the cover hood and project therefrom at the machine inlet and outlet.

In conformity with this arrangement of the air passages, the end faces of the heat pump housing are at the bottom part provided with air inlet slots while simultaneously the possibility is created when providing two or more heat pumps on a dishwashing machine, to interconnect the same by directly arranging adjacent to each other or by the provision of a connecting passage in the air guiding system. In this way there is simultaneously obtained the possibility for purposes of adapting the power output to the respective condition of operation, for instance, when running the half load, to turn off one heat pump while nevertheless to assure the withdrawal of the vapors on both sides of the dishwashing machine and to assure the condensation of the reduced water steam obtained when running at half load by means of at least one machine continuing in operation.

Inasmuch as the steam discharge from the dishwashing machine at the inlet and outlet side is not the same, but on the inlet side is less and at lower temperatures, care has to be taken that the heat pumps of the steam air mixture are preferably and correspondingly dosed withdraw at the outlet side and for which purpose in conformity with the invention control devices are arranged at the inlets of the air passage.

It is a further object of the invention with the through-flow direction of the dishwasher which change in conformity with the local conditions to provide a heat pump which will remain the same and uniform for all conditions, but which as to its construction takes into consideration the right-left designs of the dishwashing machines. According to the invention, to this end, the dimension of the vaporizer is selected smaller than the clear cross section of the heat pump housing so that the steam-air mixture from the intake opening which faces away from the inlet side of the evaporator can on all sides, or at least on one side pass by the evaporator on the outside thereof.

Referring now to the drawings in detail, in all figures the heat pump is designated with the reference numeral 1, the passages on the intake side with the reference numeral 2, the passage on the outlet side with the reference numeral 3, the dishwashing machine with the reference numeral 4, the dish intake path with the reference numeral 5, the dish outlet path with the reference numeral 6, and the connecting passage with the reference numeral 7. The heat pump comprises primarily the motor compressor 11, the evaporator 12, the condenser 13, and the auxiliary condenser 14, which latter simultaneously forms a collector and an undercooler. The ventilator 16 is arranged in the heat pump housing 17.

The ventilator 16 draws the air-steam-mixture through the air passages 2, 3 and through inlet means including two air inlet slots 21 and 31 to the inlet side of the evaporator 12; each inlet includes an air flow control valve noted subsequently herein. In the evaporator 12, the air-steam mixture is cooled while the steam is condensed and the dehumidified cooled air at the discharge opening 19 is blown upwardly into the atmosphere.

With arrangement of heat pumps according to FIG. 3, the connecting passage 7 makes possible an interchange of air-stream-mixture among the heat pumps.

The air intake chamber 18 brings about a uniform flow through the evaporator 12 and at the same time takes care of the separation of water droplets which might possibly have been carried along.

The air passages 2 and 3 in that portion thereof which projects beyond the dishwashing machine housing are open at the bottom whereby the ventilator 16 directly draws in the steam or vapors leaving the machine inlet opening 41 and the dishwasher outlet opening 42. In order to adapt the drawn-in quantity to the differing steam occurrence at the machine inlet and outlet side, the inlet areas of the air passages for instance air inlet slots 31, 21 are provided with control devices 175, 176 such as valves or slides which make possible a change of through-flow cross section.

The heat which is withdrawn from the steam-air mixture in the evaporator 12 is discharged in the condenser 13 and additional condenser 14. A non-illustrated water circulating pump arranged on the dishwasher pumps the tank water through the conduit 131 and through the condenser from where it is heated by the tank water return line 132 and flows to the tank. In the auxiliary condenser 14 which simultaneously acts as collector and undercooler, the fresh water necessary for the post rinsing in the dishwasher is preheated while it flows to the auxiliary condenser 14 through the post-rinsing water line 141 and through the post-rinsing water return line 142 is passed to the hot water heater. The tank water lines 131 and 132 and the fresh water lines 141 and 142 are continued after leaving the heat pump housing within the dishwasher - not visible from the outside. The heat pump housing 17 consists primarily of dismountable wall parts 171 and a housing central section 172 which is fixedly mounted on the housing base frame 174, and in which the control instruments 173 are located.

By means of the motor compressor 11, the working medium (for instance, Difluorodichloromethane) of the heat pump is compressed and pressed into the condenser 13 which conveys the condensation and compression heat to the tank water of the dishwasher. In the next following auxiliary condenser 14, which simultaneously acts as collector and undercooler, a portion of the condensation heat and the entire undercooling heat is conveyed to the post-rinsing water of the dishwasher, which post-rinsing water is to be preheated. The liquid working material now passes through a throttle member (expansion valve) to the evaporator 12 where it expands to evaporation pressure and evaporates and where it withdraws the heat necessary for the evaporation from the steam-air mixture withdrawn at the dishwasher machine. The vaporous working medium is through a suction line withdrawn from the motor compressor 11 where the described cycle starts anew. According to the invention, the throttling device preceding the evaporator 12 does not consist of a single expansion valve but of two parallelly arranged expansion valves which have shut-off elements associated therewith. One throttle member is designed as thermal expansion valve 113 which influenced by the overheating temperature in the suction line takes care of a complete action upon the evaporator 12 and is associated with the electromagnetic shut-off valve 116. In the parallel pipe line, the automatic expansion valve 114 is arranged, which when brought into action will in the evaporator 12 maintain a preselected evaporation pressure and thereby a preselected evaporation temperature. This automatic expansion valve 114 has associated therewith the electromagnetic shut-off valve 115. If care is taken to the effect that the shut-off valve 116 opens while the shut-off valve 115 remains closed, the thermal control expansion valve 113 will set the highest possible evaporation temperatures and thereby also the highest possible output of the heat pump. If now, due to the fact that the heat withdrawn in the dishwasher is too low, for instance, when operating the dishwasher under half load, the water temperature and the washing tank and thus the condensation pressure of the heat pump would rise too high, it is necessary to throttle the heat output, since the heat pump during the running period of the dishwasher must not be shut off. This is effected in such a way that a thermostat turns off the shut-off valve 116, but at the same time through an auxiliary contact, the shut-off valve 115 is made effective and thus opened. Now the working medium flows through the automatic expansion valve 114 to the evaporator which throttles the heat pump output to such an extent that in spite of the machine continuing to run, no inadmissible pressure can occur in the condenser 13. As soon as the temperature of the tank water and thereby the condensation temperature drops again, the valve 116 affected by the thermostat opens while at the same time the shut-off valve 115 closes, and the heat pump will again work with a maximum output.

When operating the dishwasher at full load, the heat output of such heat pump is composed approximately of 22.5% compressor and auxiliary drive heat, approximately 55% of evaporation heat of the working medium, and approximately 22.5% of undercooling heat of the working medium. Since with correspondingly designed dishwashing machines with reduced load also the post-rinsing water requirement is reduced, the undercooling heat drops by itself. Evaporation heat and heat equivalent of the compressor work can be reduced by means of the automatic expansion valve 114 by slightly acting upon the evaporator 12. With this step it is possible to reduce the heat output of the heat pump by more than 50%.

Figure 7:
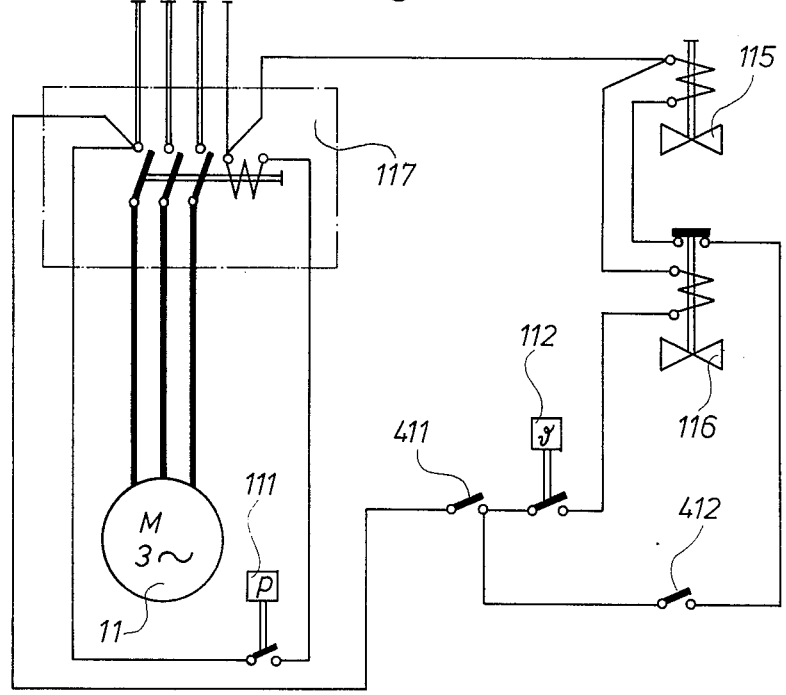
FIG. 7 is an electrical diagram for use in connection with the arrangement of FIG. 6, in which, however, all control devices not required for the explanation of the invention have been omitted.

The consideration of the various conditions of operation of the dishwasher will now be described in connection with FIG. 7.

The motor compressor 11 is directly or indirectly controlled through the intervention of a main control relay 117. With the preferred indirect control, a pressure monitor (Pressostat) in the suction line of the working medium circuit takes care of the turning on and stopping of the motor compressor. As soon as one of the two shut-off valves 115, 116 opens, the pressure in the evaporator 12 and thus in the suction line to the compressor increases. The Pressostat 111 closes the control circuit and the machine starts. If both shut-off valves are closed, the motor compressor draws in until the Pressostat 111 interrupts the control line.

The shut-off valves 115, 116 are controlled by the common thermostat 112 in conformity with the condition of operation. When heating up the dishwashing machine, the control circuit is closed by the switch 411. This switch may be, for instance, a manual switch with a designation heating up, or the switch of a tank water level control which when reaching the required filling level in the tank of the dishwashing machine closes the control line. If then, the tank water is still too cold, also the thermostat 112 has closed the control circuit, and the magnetic coil of the shut-off valve 116 is passed through by current whereby the valve opens and the pressure in the evaporator 12 is increased. Affected by this increase in pressure, the Pressostat 111 closes the control circuit in the control relay 117, and the motor compressor 11 starts.

If, in the condition of operation, a "heating up" of the tank temperature has been obtained, the thermostat 112 opens the control circuit and the magnetic valve 116 closes while the motor compressor 11 draws in up to shut-off pressure and is then stopped by the Pressostat 111. Due to this play with turning on and stopping the motor compressor, it is possible after the heating up to maintain the tank water temperature at will up to the start of the dish rinsing. Of course, the same can be realized if the thermostat 112 would directly control the control circuit in the relay 117. The indirect control via the Pressostat 111, however, brings about various advantages, for instance, during longer standstill intervals no working medium can condense in the crank housing of the motor compressor 11, and knocks by the liquid, and the feared oil foaming during the starting of the compressor will be avoided.

In the condition of operation "rinsing" in other words, when the washwater pumps of the dishwashing machine are turned on, a turning off and stopping of the motor compressor for controlling the tank water temperature is no longer possible so that now when reaching the highest maximum tank water temperature, the heating output of the heat pump must be drastically reduced. With the turning on of the wash pumps in the dishwashing machine, simultaneously the switch 412 is closed. When now the thermostat 112 interrupts the control circuit to the shut-off valve 116 it will be appreciated that simultaneously by the auxiliary contact (it may also be an auxiliary relay, or the like), the control circuit for the shut-off valve 115 is closed whereby the working medium flows to the heat pump no longer through the thermostatically controlled expansion valve (control valve) 113, but through the automatic expansion valve (control valve) 114, which considerably stronger throttles, flows to the evaporator 12. As soon as, due to this drastic reduction in the heat output, the tank water temperature has dropped again, the thermostat 112 closes the control circuit to the shut-off valve 116. Simultaneously, the auxiliary contact opens in the control circuit to the shut-off valve 115 whereby the latter is closed, and the machine works under full load again controlled by the thermostatic expansion valve 113.

As will be evident from the above, the present invention has created a device for recovering the heat losses of commercial dishwashing machines, which device is appealing as to form and is highly efficient in function while not requiring any additional space and automatically responding to all conditions of operations of the machine, i.e. heating up, maintaining temperature, rinsing, while maintaining the temperature and stopping.

There is to be understood that a pair of units can be provided in end to end relation providing two heat pumps on a dishwashing machine. Duct means for each unit comprise an inlet at each end of the respective unit; the inlets at the ends of the units facing each other comprise a single inlet. Thus the heat pump housings 17 are interconnected at the air side or by directly arranging the housings adjacent to each other or through the connecting passages.

It is, of course, to be understood that the present invention is, by no means, limited to the specific showing in the drawings, but also comprises any modifications within the scope of the appended claims.

What is claimed is:

1. An apparatus for recovering heat from a dishwashing machine comprising; at least one unit constructed for mounting on top of the dishwashing machine and having a housing, said unit including duct means in said housing having inlet means to receive air heated by the dishwashing machine and also having outlet means and means for causing air flow through the duct means, said unit comprising a heat pump and condenser means connected to receive fluid from the heat pump and an evaporator connected to receive fluid from the condenser means and discharging the fluid to the heat pump, and said evaporator being in said duct means and operable to transfer heat from air flowing in the duct means to the fluid in the evaporator and to condense water vapor entrained in the heated air, and said condenser means including means for transferring heat from the fluid discharged by said heat pump into water, at least some of the water being employed during operation of said dishwashing machine.

2. An apparatus according to claim 1 in which said evaporator is smaller in at least the lateral direction than said housing to permit flow of air in the housing along the sides of said evaporator.

3. An apparatus according to claim 1 in which the dishwashing machine includes lateral openings for the supply of dishes thereto and the withdrawing of dishes therefrom and said inlet and outlet means for said duct means are disposed above the openings in the machine.

4. An apparatus according to claim 1 in which said inlet means includes two inlet slots and each said inlet means includes an air flow control valve therewith.

5. An apparatus according to claim 1 which includes a pair of said units in end to end relation, the duct means for each unit comprising an inlet at each end of the respective unit, the inlets at the ends of said units facing each other comprising a single inlet.

6. An apparatus according to claim 1 which includes first and second conduits in parallel connecting the outlet side of said condenser means to the inlet side of said evaporator, a shut off valve and a flow control valve in series in each conduit, thermostat means sensitive to the temperature of the fluid leaving the evaporator and connected in controlling relation to the flow control valve in said first conduit, the flow control valve in said second conduit being of fixed value, and control means for selectively actuating said shut off valves between open and closed positions whereby flow is interrupted in at least one of said conduits at all times.

7. An apparatus according to claim 6 in which said control means holds the shut off valve in said first conduit open until the temperature of the water leaving the condenser means reaches a predetermined temperature and then closes the shut off valve in said first conduit.

8. An apparatus according to claim 7 in which said control means includes a thermostatic switch sensitive to the temperature of the water leaving the condenser means and operable to control the opening and closing of at least the said shut off valve in said first conduit.

9. An apparatus according to claim 1 which includes a motor drivingly connected to the heat pump, and a pressure operable switch connected for controlling the energization of said motor, said pressure operable switch being sensitive to the pressure at the inlet side of the heat pump and causing said motor to be energized when said pressure rises above a predetermined minimum.

10. An apparatus according to claim 7 in which said control means includes a thermostatic switch sensitive to the temperature of the water leaving the condenser means and operable to control the opening and closing of at least the said shut off valve in said first conduit, a motor drivingly connected to the heat pump, and a pressure operable switch connected for controlling the energization of said motor, said pressure operable switch being sensitive to the pressure at the inlet side of the heat pump and causing said motor to be energized when said pressure rises above a predetermined minimum, said thermostatic switch closing the shut off valve in said first conduit in response to the temperature of the water leaving said condenser means exceeding a predetermined value, and a switch which closes during the rinse cycle of the machine and causes the shut off valve in said second conduit to open simultaneously with the closing of the shut off valve in said first conduit whereby the pressure at the inlet of said heat pump remains high enough to maintain the said motor energized during the rinse cycle of the machine.

11. The method of conserving heat in a dishwashing machine of the type in which dishes enter the machine via a feed opening in one side of the machine and leave the machine via a discharge opening in the opposite side of the machine which comprises; withdrawing heated air from said openings, passing the withdrawn air in heat exchange relation with a coolant fluid to extract heat from the air, compressing the coolant fluid, and passing the compressed coolant fluid in heat exchange relation with water to be employed in the machine to extract heat from the refrigerant.

12. The method according to claim 11 which includes controlling the rate of supply of coolant fluid to the region of exchange of heat thereof with said air in conformity with the temperature of the coolant fluid following the exchange of heat from the air to the coolant fluid and also in conformity with the temperature of the water following the exchange of heat from the coolant fluid to the water.

\* \* \* \* \*